United States Patent [19]

Streefland et al.

[11] Patent Number: 5,168,737
[45] Date of Patent: Dec. 8, 1992

[54] METHOD OF PRODUCING A PLATE-SHAPED PRODUCT COMPRISING POSITIONING A COMPONENT WHICH IS CONNECTED TO OR FORMS PART OF A PLATE, AND ALSO DEVICE SUITABLE FOR CARRYING OUT THE METHOD AND PLATE-SHAPED PRODUCT WHICH CAN BE MANUFACTURED ACCORDING TO THE METHOD

[75] Inventors: Gerardus J. J. Streefland; Hillebrand J. J. Kraakman, both of Eindhoven, Netherlands; Henricus M. Ruyten, Vienna, Austria; Heinrich Hutter, Vienna, Austria; Walter Trowal, Vienna, Austria

[73] Assignee: U.S. Philips Corporation, New York, N.Y.

[21] Appl. No.: 642,740

[22] Filed: Jan. 17, 1991

[30] Foreign Application Priority Data

Jan. 22, 1990 [NL] Netherlands .......................... 9000152

[51] Int. Cl.$^5$ ...................... B21D 22/02; B21D 28/04
[52] U.S. Cl. ........................................... 72/8; 72/10;
72/21; 29/714; 83/74; 83/367
[58] Field of Search ...................... 72/8, 9, 10, 12, 31,
72/33, 702; 83/74, 176, 367, 371; 29/714, 721

[56] References Cited

U.S. PATENT DOCUMENTS

| | | |
|---|---|---|
| 4,306,435 | 12/1981 | Galdabini ............................ 72/12 |
| 4,802,357 | 2/1989 | Jones ................................... 72/10 |
| 5,001,917 | 3/1991 | Berstein ............................... 72/10 |
| 5,062,283 | 11/1991 | Miyagawa et al. .................. 72/10 |

FOREIGN PATENT DOCUMENTS

| | | |
|---|---|---|
| 0184159 | 11/1985 | European Pat. Off. . |
| 166351 | 1/1986 | European Pat. Off. .............. 72/702 |
| 2305283 | 8/1974 | Fed. Rep. of Germany .......... 72/10 |
| 36940 | 2/1988 | Japan ................................... 72/10 |

Primary Examiner—David Jones
Attorney, Agent, or Firm—John C. Fox

[57] ABSTRACT

A component (22; 23; 122) is positioned on or formed as part of a plate (20) which is supported by a bearing (14) and which is supported at the position of the component (22; 23; 122) to be positioned by a support (8). The positioning is carried out by a die (10) which together with the support is controlled by a control system, comprising one or more reference signal sources, comparators (24, 30) and amplifiers (25, 31), in such a way that the component (22; 23; 122) is accurately positioned relative to reference plane (26) relative to the plate. When the desired position of the component is reached, it is ensured that no elastic deformation are present in the plate. For this purpose, a device for carrying out the method comprises a control system (29, 30, 31, 32; 8, 36, 38; 138, 148) which controls the die (10) and/or the support (8) positions or support the die and the support or the plate (20) in such a way that the plate is free from undesired elastic deformations at least when the component reaches the desired position.

39 Claims, 11 Drawing Sheets

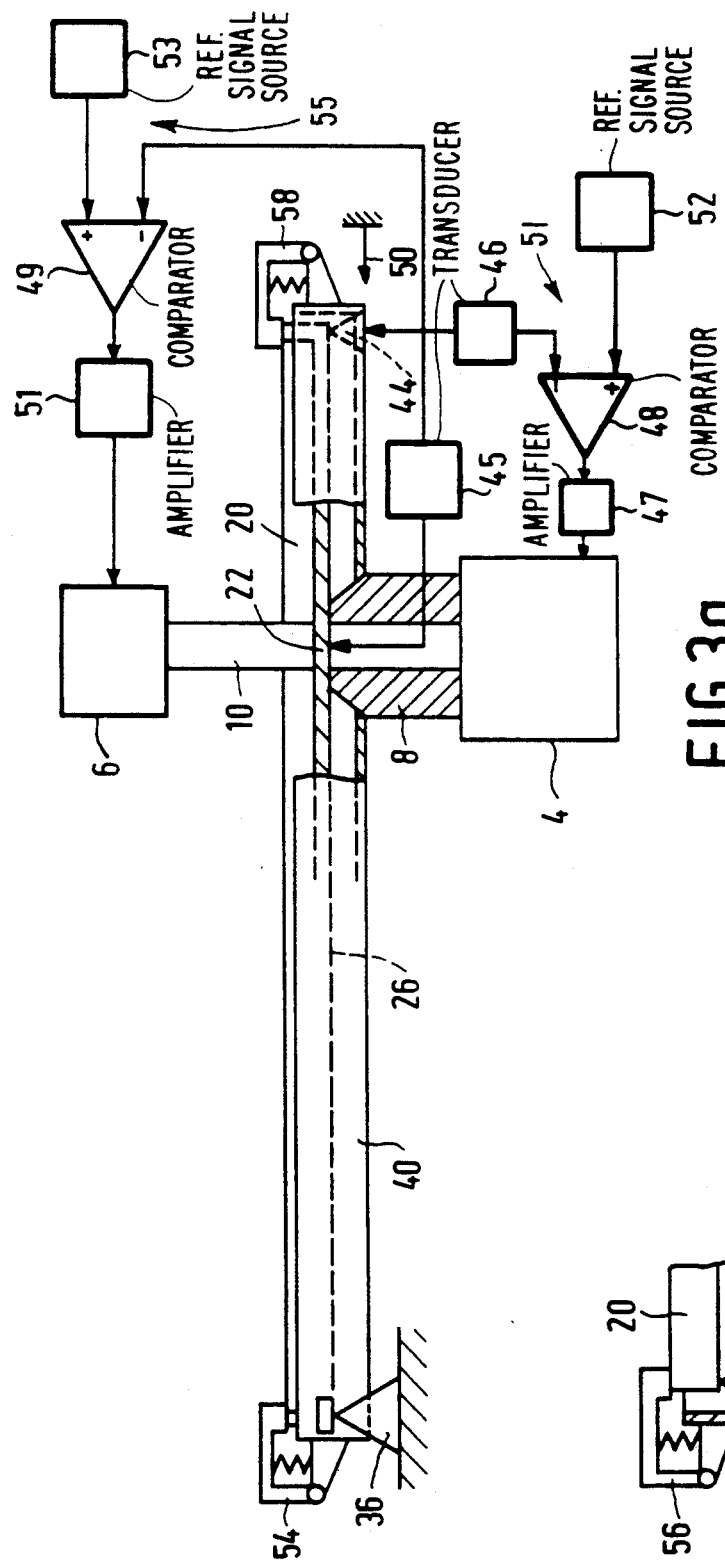
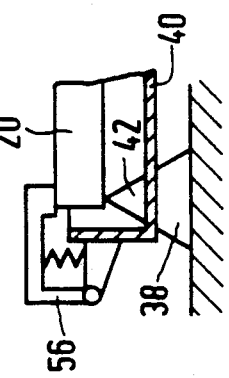
FIG.3a
FIG.3b

METHOD OF PRODUCING A PLATE-SHAPED PRODUCT COMPRISING POSITIONING A COMPONENT WHICH IS CONNECTED TO OR FORMS PART OF A PLATE, AND ALSO DEVICE SUITABLE FOR CARRYING OUT THE METHOD AND PLATE-SHAPED PRODUCT WHICH CAN BE MANUFACTURED ACCORDING TO THE METHOD

BACKGROUND OF THE INVENTION

The invention relates to a method of producing a plate-shaped product comprising positioning a component which is connected to or forms part of a plate which at the position of the component is supported by a support. A die forms the component from the plate or positions a discrete component on the plate. To this end, the term "positioning" a component means both placing a discrete component or forming a component, and thus, also placing a component, from a sheet material portion at a given sheet location. The invention also relates to a device suitable for carrying out the method and a plate-shaped product manufactured according to the method. In this context the component is considered as a part of a plate or as a discrete element. In case the component is a part of the plate this part has to be deformed at the desired position. In this case the die is intended to mean a deforming member. In case the component is a discrete element connected to the plate, the die does not deform anything but only changes the position of the discrete element with respect to the plate so the die is intended to mean an element positioning member.

A method and device of the type mentioned in the preamble are generally known in the form of a compression device provided with a top and bottom die. In such a known compression device a plate is placed on the bottom die, and the top die is then pressed against the plate in such a way that the plate deforms permanently. During the compression the plate will not only deform plastically, but a certain elastic deformation of the plate will also occur. After lifting of the top die the plate will spring back to some extent as a result of the elastic energy in the plate. This means that the final shape of the plate differs slightly from the shape of the dies. This problem is partly solved by taking the elastic springback into account and deforming the plate slightly more, but the basic shape of the plates to be deformed is not the same for all plates, which means that some plates deform elastically more than other plates, and consequently deviations in shape between the individual pressed plates will in the end still be present, albeit smaller. If the plates are intended for use as chassis plates on which components which have to be positioned very accurately relative to each other are being mounted, the positions of these components will have to be adjusted again after fitting, since deviations in the positions of the components occur through the shape tolerances of the chassis plate.

This state of affairs also occurs during the production of chassis plates for video recorders. In the case of video recorders very high standards are set for the relative positions of, inter alia, the scanning unit, the capstan and the tape guides. The required accuracy lies in the order of micrometers. Through the elastic springback of the plate, deviations of the order of tens of micrometers do, however, occur. For this reason the components are fitted in such a way that their positions are readjustable. This readjustment is costly and time-consuming.

A chassis plate in which the mounting faces for the components to be fitted are positioned accurately relative to each other is known from European Patent Application EP 0 184 159 A2. In this case the chassis plate is cast, and the mounting faces are finished in one setting. The disadvantage of this chassis plate is that the manufacture thereof is very laborious, and is therefore also costly. The cast structure also means that the plate is heavy and the material costs are high.

SUMMARY OF THE INVENTION

The object of the invention is, inter alia, to provide a method in which components of or on a plate can be positioned in a simple manner and with very great accuracy, so that finishing operations on the plate or readjustments of the components to be fitted are no longer necessary.

A further object of the invention is to provide a device by means of which the envisaged method can be carried out in an advantageous manner.

As regards the method, the invention is characterized in that the plate is supported by a bearing and during the positioning of the component (including formation by deformation of the plate or by locating a discrete component on the plate) the position of the component relative to a reference plane is measured and a control system regulates the force exerted on the plate by, or the position relative to the plate of, the die and the support, until the component assumes a desired position relative to the reference plane, while the supporting of plate and/or the positioning of the component are carried out in such a way that at least when the desired position of the component is reached the plate is free from elastic deformations. Not clamping the plate between two die faces, but allowing it to rest on a bearing ensures that no elastic deformations can occur here in the plate on account of shape deviations of the plate. Consequently there will also be no question of elastic springback of the plate. Measuring the position of the component relative to a reference plane means that it is possible to establish the degree to which the force exerted on the plate by, or the position relative to the plate of, the die and the support has to be altered to obtain the correct position of the component relative to the reference plane. The said control system comprises e.g. comparators and amplifiers. The comparators compare the output signal of measuring means with a reference signal and send control signals to the amplifiers to displace the die and/or the support. Through a suitable manner of supporting the plate and/or through a suitable manner of positioning the component, it is ensured that during positioning (including formation by deformation) of the component in the end no elastic deformations remain in the plate. This means that subsequently no springback will occur, and the correct position will be maintained.

An embodiment of the method according to the invention is characterized in that elastic deformations of the plate are detected and the control system also ensures that on reaching the desired position of the component no elastic deformations are in the end present in the plate, by regulating the force in or the position of the support during the positioning of the component. This means that as soon as elastic deformations occur in the plate they can be eliminated by changing the force in or the position of the support in such a way that compensation for the causes of the elastic deformation of the plate takes place. The elastic deformation of the plate can occur, for example, as a result of elastic sagging of a frame on which the support is present.

Another embodiment of the method according to the invention is characterized in that elastic deformations of the plate are detected by measuring the support forces in the bearing points. This is a simple method of detecting the presence of elastic deformations in a plate.

Another embodiment of the method according to the invention is characterized in that elastic deformations of the plate are detected by the displacement of the plate relative to the bearing points. This is another simple method of detecting the presence of elastic deformations in a plate.

Yet another embodiment of the method according to the invention is characterized in that the control system during the positioning of the component regulates the force in or the position of the support until the above-mentioned forces are essentially zero, or until the above-mentioned displacement is essentially zero. If these forces are zero or this displacement is zero, no more elastic deformations can be present in the plate, as a result of which no springback of the plate can therefore occur either and the position of the component is maintained.

Another embodiment of the method according to the invention is characterized in that during the positioning of the component the plate is supported only by two bearing points and by a support, so that during the positioning of the component no elastic deformation of the plate can occur. In the case of a three-point bearing, exerting a force on the plate at the position of one of the points (formed by the support) ensures that the force is borne fully by that point (support) and no reaction forces occur in the other two bearing points. This also means that no stresses can occur in the plate outside the above-mentioned point (support).

Yet another embodiment of the method according to the invention is characterized in that the component is positioned in such a way that the resulting force from the forces exerted by the die and by the support on the plate is equal to zero. If during the positioning of the component by means of the die and the support no resulting force is exerted on the plate, the plate will also not be elastically deformed outside the support. This means that there will also be no question of springback when the die and the support are removed, so that the position of the component is maintained.

A further embodiment of the method according to the invention is characterized in that the positioning takes place by pressing the component, which is formed by an element, through an aperture in the plate the element being clamped by a wall of the aperture. In this way the position of an element, for example a tape guide or a stationary magnetic head, can be positioned accurately in height. This makes height adjustment by means of an adjusting mechanism unnecessary.

Yet another embodiment of the method according to the invention is characterized in that the positioning takes place by plastic deformation of the plate locally so that a plate part comes to lie at the desired distance from a reference plane, the component being formed by the above-mentioned plate part. In this way a mounting face can be provided in a plate with very great accuracy. It is possible to fit thereon, for example, a scanning unit of a video recorder or a motor of a capstan, the position of which must be known very accurately.

It can, however, occur that the position of a component of the plate already corresponds to the desired position. In this exceptional case the plate will not be deformed during positioning.

A related embodiment of the method according to the invention is characterized in that the plastic deformation takes place by locally stretching the plate. Due to the fact that this stretching takes place locally, namely only at the support, the elastic deformation of the plate is small and the springback of the plate is negligible.

Another related embodiment of the method according to the invention is characterized in that plastic deformation takes place through shearing in the plate. During shearing, the plate is almost exclusively plastically deformed. As a result, after positioning of the component, virtually no springback of the deformed part occurs, and the position will be maintained very accurately.

Yet another related embodiment of the method according to the invention is characterized in that the plastic deformation takes place through upsetting of the plate. In the course of this, the plate can be made thinner locally. This is an advantage if an element is being fixed on the plate at the position of the component by means of laser welding. The side of the plate facing away from the element to be fitted is in this case heated locally by a laser, thereby producing a welded joint. With a smaller thickness of the plate at the joint to be formed, less energy is needed, which means that fewer stresses also occur in the plate.

Yet another related embodiment of the method according to the invention is characterized in that the plastic deformation occurs through extrusion of the plate. This means that a component, for example a capstan branch connection, can be formed in the plate in a simple and accurate manner.

A further embodiment of the method according to the invention is characterized in that the reference plane is determined by measuring the positions of bearing points of a bearing, in which case a plane through the bearing points forms the reference plane. If the bearing comprises three bearing points, this means that for each plate, regardless of the deviations as a result of shape tolerances, a component of or on the plate can be positioned with very great accuracy relative to the three points present on the plate.

Yet another embodiment of the method according to the invention is characterized in that various components are positioned after one another in terms of time. This has great advantages if different components of which the positions relative to one another have to be very accurately fitted on the plate.

The relative positions of the components are often the only important factor, and not the positions of the components relative to the plate. This is the case with, for example, a video recorder, where only the relative positions of the tape guides are important. The desired relative positions are obtained by fitting each component accurately relative to a reference plane. The positions of the components are determined relative to a reference plane through the plate and not relative to the plate itself, since in the latter case the positions of the components relative to each other might be incorrect, owing to the shape tolerances of the plate.

A related embodiment of the method according to the invention is characterized in that a further reference plane is determined by positioning three components so that a plane through reference points on these components forms the further reference plane for the remaining components to be positioned thereafter. Taking as reference plane a plane through reference points which are present, for example, on the first three positioned components and which serve, for example, as mounting faces for a scanning unit of a video recorder ensures that the position of these components need not be so accurate. They can, for example, all be present in the plate beforehand. The components to be fitted thereafter then in turn do have to be fitted with great accuracy relative to the reference plane. In this way the mutual positions of the parts are achieved even more accurately.

As regards the device, the invention is characterized in that the device is provided with a main frame to which a movable die and a movable support are fixed for positioning a component when a plate is present, an auxiliary frame, provided with a bearing for bearing a plate, measuring means for determining the position of the component relative to a reference plane when the plate is present, a control system for controlling the die and/or the support until in the presence of the above-mentioned plate the reference point is in the desired position, and means which control the die and/or the support or bear the plate or the die and the support in such a way that at least when the desired position of the component is reached the plate is free from elastic deformations. The position of the component can be measured with this device. With this measured value the control system can control the die and the support in order to obtain the desired position of the component. Due to the fact that in the device the main frame to which the die and the support are fixed and the auxiliary frame on which the bearing is located are separated from each other, the working forces cannot influence the bearing. With the above-mentioned means, finally, it can be ensured that elastic deformations of the plate, as a result of a load exerted by the die, are eliminated. This can take place only if the bearing of the plate does not result in a statically overdetermined situation. As a result of a statically overdetermined situation elastic deformations can occur in the plate. Since there is nothing to regulate on the bearing, there can thus be elastic deformations present in the plate which cause the plate to spring back after fitting of the component. If the plate lies on a bearing, as is the case with the present device, no statically overdetermined situation is obtained and, purely because of the bearing, elastic deformations cannot occur in the plate.

An embodiment of the device according to the invention is characterized in that the above-mentioned means comprise the control system and a regulator of the control system controls the support. The elastic deformations in the plate can be influenced by changing the position of or the force in the support, and can even be totally removed by means of a suitable regulation.

A further embodiment of the device according to the invention is characterized in that the device also comprises measuring means for, where the above-mentioned plate is present, measuring the displacement of the plate relative to the reference plane. The presence of elastic deformations in the plate can be detected in this way. No elastic deformations are introduced into the plate through the bearing. If the plate is now displaced at the position of the support, which can take place through the fact that the die exerts a force on the plate, elastic deformations will be present in the plate. Thus so long as a displacement not equal to zero is measured, the control system will have to ensure that the displacement is removed by, for example, adapting the position of the support.

Yet another embodiment of the device according to the invention is characterized in that the bearing is formed by three bearing points, and the device also comprises measuring means for measuring the force in at least one of the bearing points. This is another embodiment with which the presence of elastic deformations in the plate can be detected. Here again, no elastic stresses can be introduced into the plate, due to the three-point bearing. If a force is measured here in a bearing point, this force can be transmitted only via the plate, so that elastic stresses must be present in the plate. As long as this force is not equal to zero, elastic deformations will be present in the plate, and the control system eliminates them.

Another embodiment of the device according to the invention is characterized in that the above-mentioned means comprise two bearing points and the support. By placing the plate on two bearing points and the support and making the load by the die act on the plate at the position of the support, the plate cannot deform elastically either as a result of the bearing or as a result of the load. The control system can be simplified as a result of this.

An embodiment of the device according to the invention is characterized in that the device also comprises a sub-frame, provided with three further bearing points on which the plate can rest, which sub-frame rests on the two bearing points present on the auxiliary frame, and which device also comprises measuring means for measuring the position of the component and of the sub-frame relative to an external reference. Through the means described above, the control system now needs only to regulate that the correct position of the component relative to the reference plane is obtained. This is possible by regulating that the position of the sub-frame, which also determines the position of the reference plane, remains constant, and that the desired position of the component is achieved.

Yet another embodiment of the device according to the invention is characterized in that the die and the support form part of a pincer construction which has a center of gravity and is supported, at the center of gravity, on bearings on the main frame and in that the means for preventing residual elastic deformation in the plate after positioning of the component comprises the bearing. By supporting the pincer mechanism in its center of gravity the resulting force from the forces which are exerted on the plate by the die and by the support is equal to zero. This therefore means that the plate is not loaded, and no elastic deformations occur in the plate. By fitting several of such pincer mechanisms on the main frame, it is possible with this device to position various components simultaneously on one plate without elastic deformations occurring in the plate.

An embodiment of the device which is a further development of the above is characterized in that the bearing comprises a hydrostatic bearing having a fluid inlet and outlet aperture, which apertures are located in that part of the bearing which is stationary and attached to the main frame. As a result of the use of a hydrostatic bearing in which virtually no frictional forces arise it is not possible that a moment can be transmitted via the bearing to the main frame. Consequently, it is therefore not possible for a resulting force to be exerted on the plate by the die and the support.

A further embodiment of the device which is a further development of the above is characterized in that the pincer construction comprises a hydraulic cylinder having fluid inlet and outlet lines which, at the location of further fluid inlet and outlet apertures located in the movable part of the hydrostatic cylinder, are coupled with the hydrostatic bearing, the inlet and outlet apertures being in connection, via ducts through the bearing, with the further inlet and outlet orifices. By virtue of this construction no forces can be exerted on the pincer construction via the inlet and outlet lines of the hydraulic cylinder of the pincer construction. If the lines are attached directly to the main frame forces can be exerted on the cylinder, and thus on the pincer construction, as a result of pressure variations in the lines. As the lines are now not connected directly to the main frame but are connected to the movable part of the bearing, which is rigidly connected to the pincer construction, it is therefore not possible for any external forces to be exerted on the pincer mechanism via the lines.

An embodiment of the device according to the invention is characterized in that the device comprises at least one hydraulic cylinder for displacing the die and/or the support. Great forces can be applied in a readily controllable and regulatable manner by means of a hydraulic cylinder.

Yet another embodiment of the device according to the invention is characterized in that the device comprises a movable arm on which the die and the support are situated. This means that by displacement of the arm various components can be positioned on one plate with one die/support combination.

Yet another embodiment of the device according to the invention is characterized in that the device comprises various dies and supports and has various hydraulic cylinders for displacement of the dies and the supports. This also has the advantage that various components can be positioned on a plate as a result.

Yet another embodiment of the device according to the invention is characterized in that the auxiliary frame is displaceable relative to the main frame. This also means that various components can be positioned on one plate with one die/support combination.

As regards the plate-shaped product, the invention is characterized in that apertures are present in the plate on either side of a plate part which comprises a central plate part which forms the component and takes up a desired position relative to a reference plane through the plate, and which plate part comprises connecting plate parts which connect the central plate part to the remainder of the plate. Due to the fact that the plate part is connected by means of connecting parts to the remainder of the plate, for the plate part, forming the component, of the reference point the deformation of the connecting points is already sufficient. In this way a component can be positioned with less deformation energy than in a solid plate.

An embodiment of the plate-shaped product according to the invention is characterized in that the central plate part is sheared relative to the connecting plate parts. Due to the fact that during shearing hardly any elastic energy goes into the plate, no springback occurs and a very high position accuracy of the central plate part is obtained.

A further embodiment of the plate-shaped product according to the invention is characterized in that the connecting plate parts are stretched. In this case the position accuracy is achieved by stretching the connecting parts, and here again the plate is hardly deformed elastically.

BRIEF DESCRIPTION OF THE DRAWING

The invention is explained in greater detail below with reference to examples of embodiments shown in figures of devices which are suitable for carrying out a method according to the invention.

Herein:

FIG. 3a shows a third embodiment of a device in which the plate is supported only by two bearing points and by the support;

FIG. 3b shows a cross-section of the device shown in FIG. 3a rear the bearing points;

FIG. 8b shows a cross-section of a hydrostatic bearing used in the embodiment shown in FIG. 8a;

DESCRIPTION OF THE PREFERRED EMBODIMENTS

Figure 1:
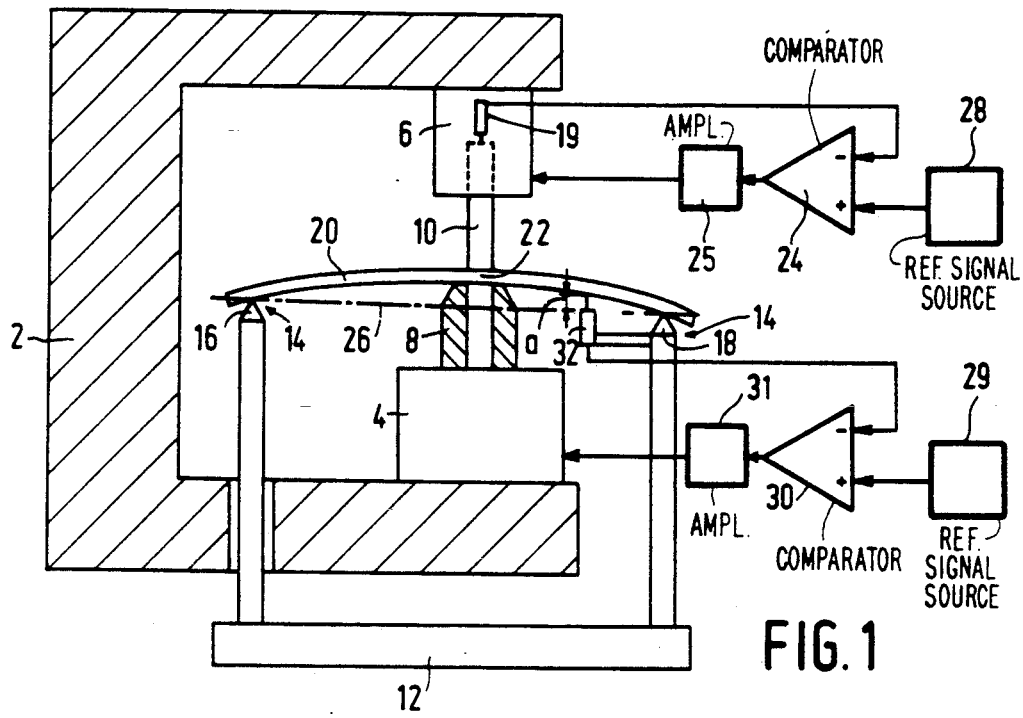
FIG. 1 shows a first embodiment of a device in which a regulator of the control system regulates the support, and in which elastic deformations of the plate are detected by measuring the displacement of the plate.

FIG. 1 shows schematically a first embodiment of a device by which a method according to the invention can be carried out. The device comprises a main frame 2 to which two hydraulic cylinders 4 and 6 are fixed for the displacement of a support 8 and a die 10. The device also comprises an auxiliary frame 12, provided with a bearing 14, for example comprising three bearing points 16, 18 (two of which are shown) for bearing a plate 20.

A portion 22 of the plate 20 can be deformed by means of the die 10, which interacts with the support 8, to form a component on plate 20

With this device possible to position portion 22 of the plate 20 relative to a reference plane 26 to an accuracy of a few micrometers, by displacing the so fomed component at portion 22 relative to the remainder of the plate 20, for example through shearing in the plate. For this, the position of the portion 22 relative to the reference plane 26, which is formed, for example, by a plane through the three bearing points 16, 18, is determined using measuring means comprising a linear transducer by way of example. Other linear 19, the displacement of the die 10 is regulated until the portion 22 assumes the desired position. In this example the linear transducer 19 measures the displacement and produces an output signal manifesting the magnitude of displacement of die 10. This displacement is regulated by a control system comprising a reference signal source 28, a comparator 24 and an amplifier 25, which maintains the portion 22 in the desired position relative to the reference plane 26 during the process. To this end, the comparator 24 compares the output signal from the transducer 19 with a reference signal, generated by source 28, the reference signal representing the value the output signal of transducer 19 when the die 10 is at its desired position. The difference between these signals is applied to the amplifier 25 which produces a control signal displaces the die 10 in response to the value of that applied control signal.

During the deformation of the plate 20 the main frame 2 will sag slightly, causing the support 8 to move and elastic deformations to occur in the plate. As a result of these deformations, after the positioning of the portion 22, the plate 20 springs back, so that the position of the portion 22 relative to the reference plane 26 changes. In order to ensure that when the desired position of the portion 22 is reached the plate is free from these elastic deformations, the control system comprises a further reference signal source 29, a further comparator 30 and a further amplifier 31 are the device is provided with a further linear transducer for measuring the displacement distance a of the plate 20. The elastic deformations are now removed from the plate by moving the support 8 by cylinder 4 in such a way that there is compensation for the sag of the main frame 2. For this, the distance a of the plate 20 relative to the reference plane 26 is measured using the transducer 32, and The support 8 is displaced until the distance from the plane 26 manifested by the output of transducer 32 is equal to the measured distance of plate 20 before the portion 22 is positioned. If in the situation of FIG. 1 (the plate 20 rests on three bearing points 16, 18) the distance a of the plate to the reference plane 26 at any place other than the bearing points is equal to the corresponding distance in the beginning i.e. before the portion 22 is positioned and before a deformation force is applied to the plate, so the displacement of the plate at that place is zero, then the displacement of any other place of the plate also has to be zero. So detecting that distance a is the same as in the beginning and has the same result as stating that the plate 20 is free of any stresses. The displacement of the support 8 is regulated by the control system in the same way as the displacement of the die 10 is regulated.

The displacement of the support 8 can in turn result in the die 10 being shifted slightly as a result of sagging of the main frame 2. However, as already stated, the control system compensates for this movement.

Figure 2:
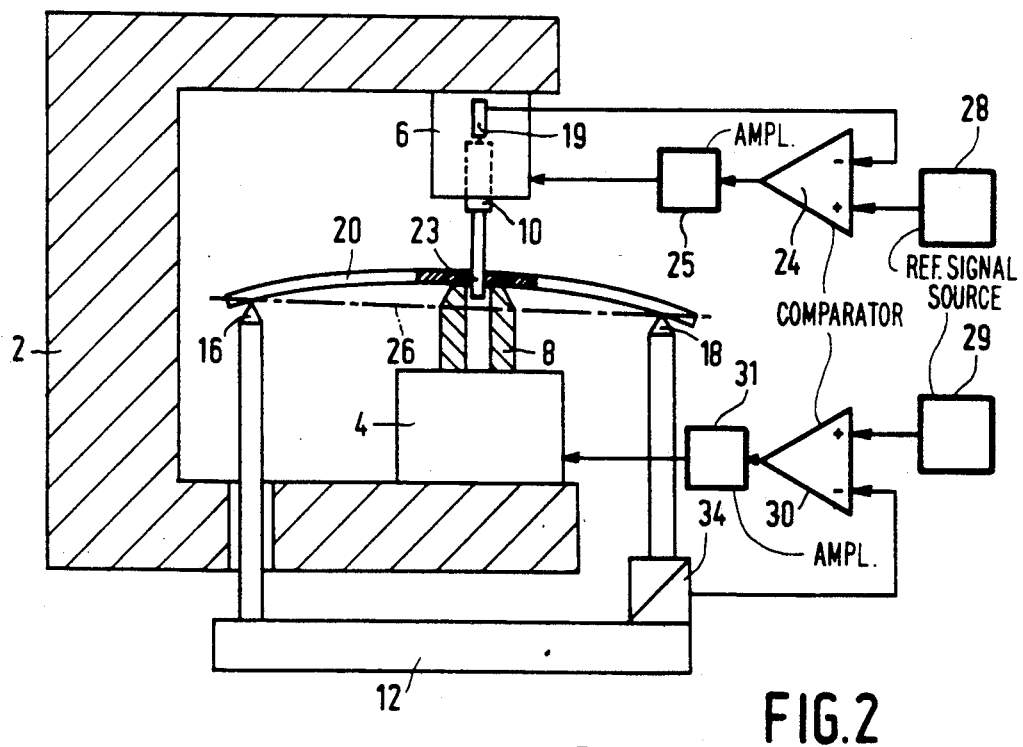
FIG. 2 shows a second embodiment of a device in which elastic deformations of the plate are detected by measuring the forces in a support bearing.

FIG. 2 shows schematically a second embodiment, which differs from the embodiment described above in that the elastic deformations in the plate are detected by measuring the forces in a plate support bearing. For this purpose, the device comprises in place of transducer 32 of FIG. 1 measuring means which is a force measuring unit 34 for measuring the force in one of the bearing points 18. If the force in one of the bearing points is zero, it follows from the moment equilibrium that the forces in the other bearing points must also be zero, from which it then follows that no elastic deformations are present in the plate. As is shown in FIG. 2, not only a part of the plate can be deformed by the device in order to position a component formed by deformed portion 22 of the plate, but also a separate component 23, in this example a pin, can be positioned on the plate.

FIGS. 3a and 3b show a third embodiment of the device, in which the occurrence of elastic deformations in the plate is avoided by means which support the plate at three points. FIG. 3b shows a part of a sectional view of the device shown in FIG. 3a parallel to the plane of the drawing and behind elements 36 and 54. The principle of this embodiment is that when a plate is supported on three points only and no forces are applied to on the plate at places other than those three points, then no stresses can occur in the plate. In this embodiment the plate 20 itself is not directly supported on the main frame but on support 8 fixed on the main frame (not shown) support 8 supports the plate 20 on one point and the main frame has two bearing points 36 and 38 supporting a sub-frame 40 comprising three further bearing points 42, 44 (two of which are shown) on which the plate 20 is clamped by means of clamps 54, 56 and 58. In this way it is easier to measure the position of the plate 20 by measuring the position of the sub-frame 40. If the main frame now sags, as a result of the reaction forces of the die and the support on the main frame, no elastic deformations occur in the plate, but the plate and thus also the sub-frame will be displaced. By measuring this displacement with the aid of measuring means comprising a linear displacement transducer 46, the support 8 can be displaced by means of a control system 51 comprising a comparator 48 a reference signal source 52 and an amplifier 47. The comparator 48 compares the output signal of the transducer 46, with a reference signal generated by source 52 representing the value of the output signal of the transducer 46 when the sub-frame is not displaced. The difference between these signals is applied to the amplifier 47 which produces a control signal which is applied to cylinder 4 to displace the support 8. As a result of this, the reference plane 26 relative to an external reference 50, and thus also the position of the plate 20 relative to the die 10 and the support 8 retain their position. The correct position of the portion 22 can also be obtained by means of a second control system 55. For this end the control system 55 comprises a further reference signal source 53 comparator 49 and an amplifier 51. By measuring the position of the component to be positioned on portion 22 by, means of measuring means comprising a linear transducer 45 and displacing the die 10 by comparing the output of transducer 45 with a reference signal from the source 53, the correct position of the component at portion 22 can be obtained and die 10 portioned accordingly by cylinder 6 in response to the applied output of amplifier 51.

Figure 4:
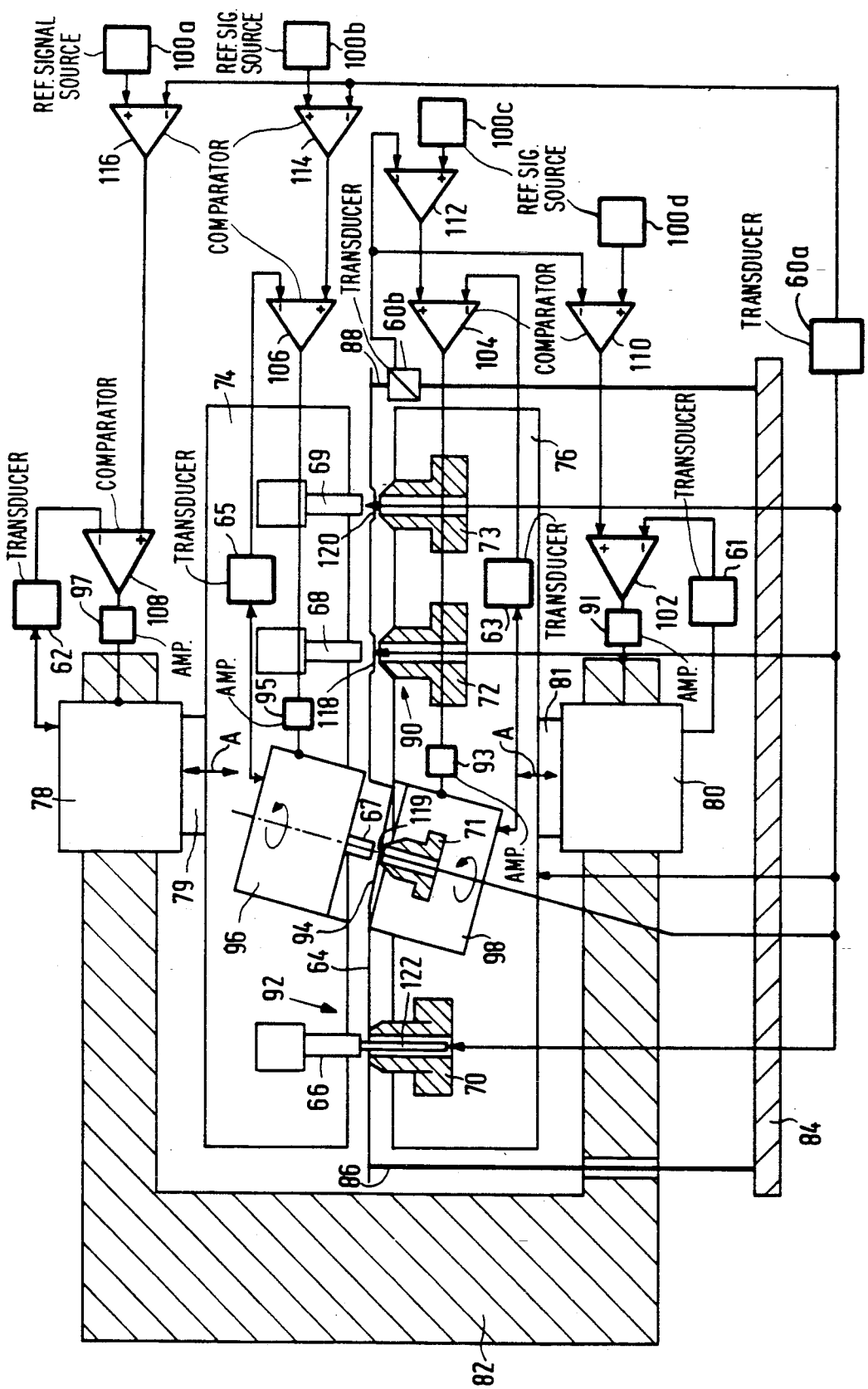
FIG. 4 shows an embodiment of a device according to a principle of one of the devices shown in FIGS. 1, 2 and 3a, by means of which various components can be positioned.

FIG. 4 shows a device with which different components 118, 119, 120 and 122 of Or on a plate 64 can be positioned. For this purpose, the device comprises various dies 66, 67, 68 and 69 and corresponding respective supports 70, 71, 72 and 73. The dies are to a top distributor plate 74, and the supports are fixed to a bottom distributor plate 76. The distributor plates 74 and 76 are each connected to a corresponding respective piston 79, 81 which are hydraulically displaceable in directions of arrows A in a main respective cylinder 78, 80. The main cylinders 78 and 80 are fixed to a main frame 82 of the device. The device also has an auxiliary frame 84 on which three bearing points 86, 88 (two of which are shown) are situated for supporting the plate 64.

The dies and the supports can each be retracted individually relative to each other. In this way all dies and supports can be brought into a retracted position 90 illustrated by die 68 and support 72. Each die/support combination can then be brought in succession temporarily into a working position 92 moved towards each other illustrated by die 66 and support 70. In the working position, a deformed component formed is the plate 20 or on separate component attached to the plate can then be positioned by controlling the hydraulic main cylinders 78, 80 in the same way as cylinders 4, 6 of FIGS. 1 and 2 are controlled.

With this device it is also possible to position components formed in or placed on a plate part 94 which is situated at an angle with the remainder of the plate. For this, each distributor plate 74, 76 has on it a respective hydraulic auxiliary cylinder 96, 98 which can be set at an angle relative to the corresponding distributor plate. The die 67 and the support 71 are displaceable in these auxiliary cylinders. For the formation and placing of the component 119, the auxiliary cylinders 96, 98 are controlled accordingly. The auxiliary cylinders can be moved in a circular path in order thus to position various components of or on the plate 64 part.

The device shown in FIG. 4 also comprises a control system for the positioning of the components and includes transducers 61, 62, 65 and 63 for indicating the positions of the respective pistons 81, 79 the die 67 and the support 71. This control system comprises four slave control systems each comprising a comparator 102, 104, 106 and 108 and a corresponding respective amplifier 91, 93, 95, 97 and each system regulating the pressure in a main or auxiliary cylinder as shown until it is equal to four desired value. This desired value is indicated by a master control systems comprising two pairs of comparator 110, 112 and 114 and 116 comparing the respective output signals generated respective measuring transducers 60a and 60b with a reference signal generated by sources 100a, 100b, 100c and 100d, each source corresponding to a respective one of comparators 116, 114, 112 and 110. Two of these comparators 110 and 112 ensure that if elastic stresses occur in the plate 64 they are reduced to zero. For this, the force is measured in one of the bearing points 88 by transducer 60b. If this force is not equal to zero, the plate 64 therefore exerts a force on the bearing point, so that the plate 64 therefore must be under stress. The force in the bearing point can be reduced to zero by regulating the force in the support 70 when it is in the working position. If the force in one of the three bearing points is zero, by way of example, the forces in the other two bearing points are also zero, so that no elastic stress can therefore be present in the plate. The force in the support 70 or other supports on distributor 76 is regulated by the pressure in the bottom main and/or auxiliary cylinder 80, 98 respectively. Two comparators 114 and 116 ensure that the component 122 at support 70 (or any other support) assumes the desired position relative to a reference plane through the plate. The position of the component is not determined relative to the plate 64 because the shape of the plate is subject to tolerances. The plane through the three bearing points is taken as the reference plane through the plate. It is a question of ensuring that all components assume the correct positions relative to each other, which amounts to the same as the components assuming the correct positions relative to an external reference. For this reason, the position of the component to be positioned is measured relative to the external reference, to which reference the bearing points are also connected. This external reference is formed by the auxiliary frame 84. The master controls via comparators 114 and 116 regulate the pressure in the top main and/or auxiliary cylinder 78, 96 respectively, so that the die 66, by way of example assumes the correct position and the component 122 thus also reaches its correct position.

As already shown in FIG. 4, the components 118, 120 need not always be a part of the plate 64, but can also be separate elements such as component 122 which are pressed through apertures in the plate 64. Component 122 in this embodiment is a pin which is pressed into an aperture in the plate. The component 122 is taken to the correct height with the aid of the die 66.

Figure 5:
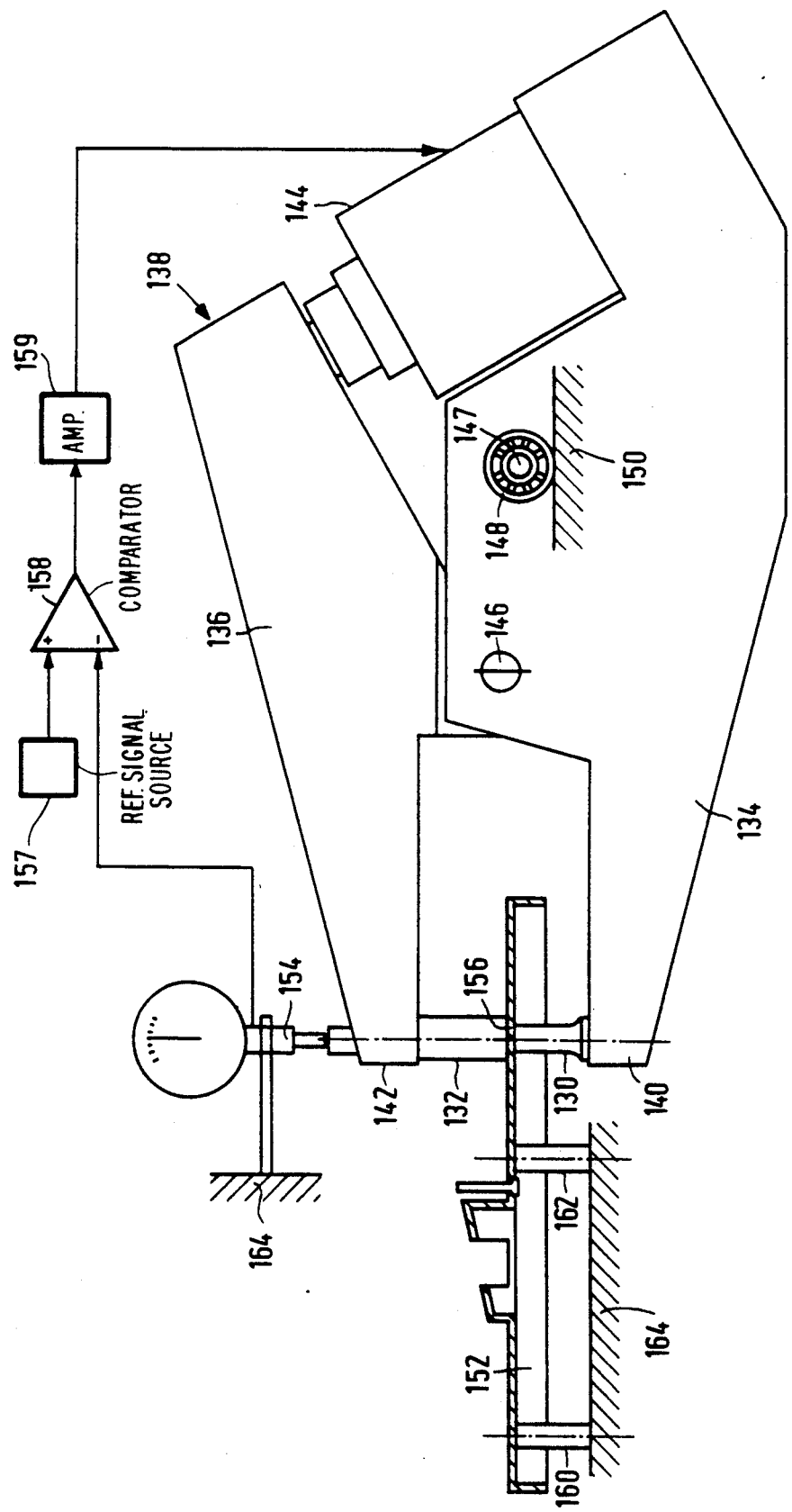
FIG. 5 shows a fourth embodiment of a device in which the die and the support are fixed to a pincer mechanism which is supported in its center of gravity.

FIG. 5 shows a fourth embodiment of a device with which a method according to the invention can be carried out. In this case the die 130 and the support 132 are each situated on a part 134, 136 of a pincer mechanism 138. The two respective ends 140, 142 of the parts can be moved towards each other or away from each other by means of a hydraulic cylinder 144 and are pivotable relative to each other about a point of rotation 146. The pincer mechanism 138 comprises upper part 136, lower part 134, the cylinder 144, the support 132 secured to upper part 136 and the die 130 secured to part 134 and is supported in its center of gravity 147, for example by means of a ball bearing 148. The bearing 148 is connected to a main frame 150. Supporting the pincer mechanism in its center of gravity ensures that the resulting force exerted by the die 130 and the support 132 on the plate 152 is always equal to zero, and no elastic deformations can thus occur in the plate. The bearing 148 of the pincer mechanism 138 in this embodiment thus forms part of the means which ensure that the plate is free from elastic deformations. The position of the support 132 is measured with the aid of a dial indicator 154. The position of the component 156 can be determined from the position of the support 132. Depending on this position of the component 156, the cylinder 144 is controlled by means of a control system comprising a reference signal source 157, a comparator 158 and an amplifier 159. The comparator 158 compares an output signal of the dial indicator 154 with the reference.. signal generated by source 157 and the difference is applied to the amplifier 159 in the same way as is described in the description of FIG. 1. It is possible also to control the cylinder manually if necessary (by means not shown).

Figure 6:
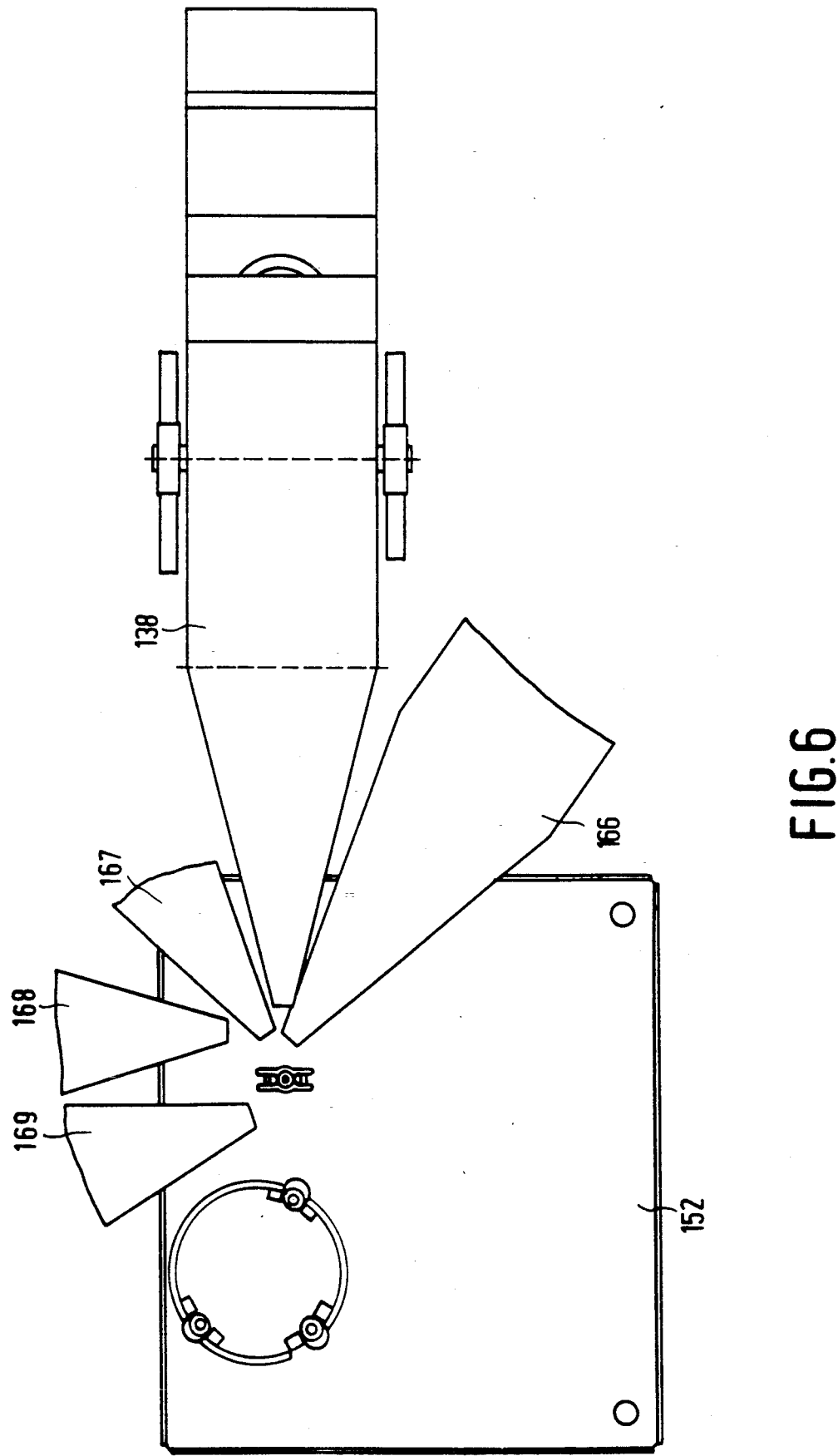
FIG. 6 shows a top view of the device shown in FIG. 5, but in this case with various pincer mechanisms.

Supports 160, 162 provide support bearing points for defining plane 152 and are connected to an auxiliary frame 164. In the case of the first three embodiments described above in connection with FIGS. 1–4 elastic deformations can still occur in the plate during simultaneous positioning of various parts, even though no force is measured in a bearing point, or even though no displacement is measured at a point. Contrasting with the embodiments described above, it is possible in the case of the fourth embodiment shown in FIG. 5 to position various components on the plate 152 simultaneously. For this, various pincer mechanisms 138, 166, 167, 168, 169 are fitted on the main frame as shown in FIG. 6.

Figure 7:
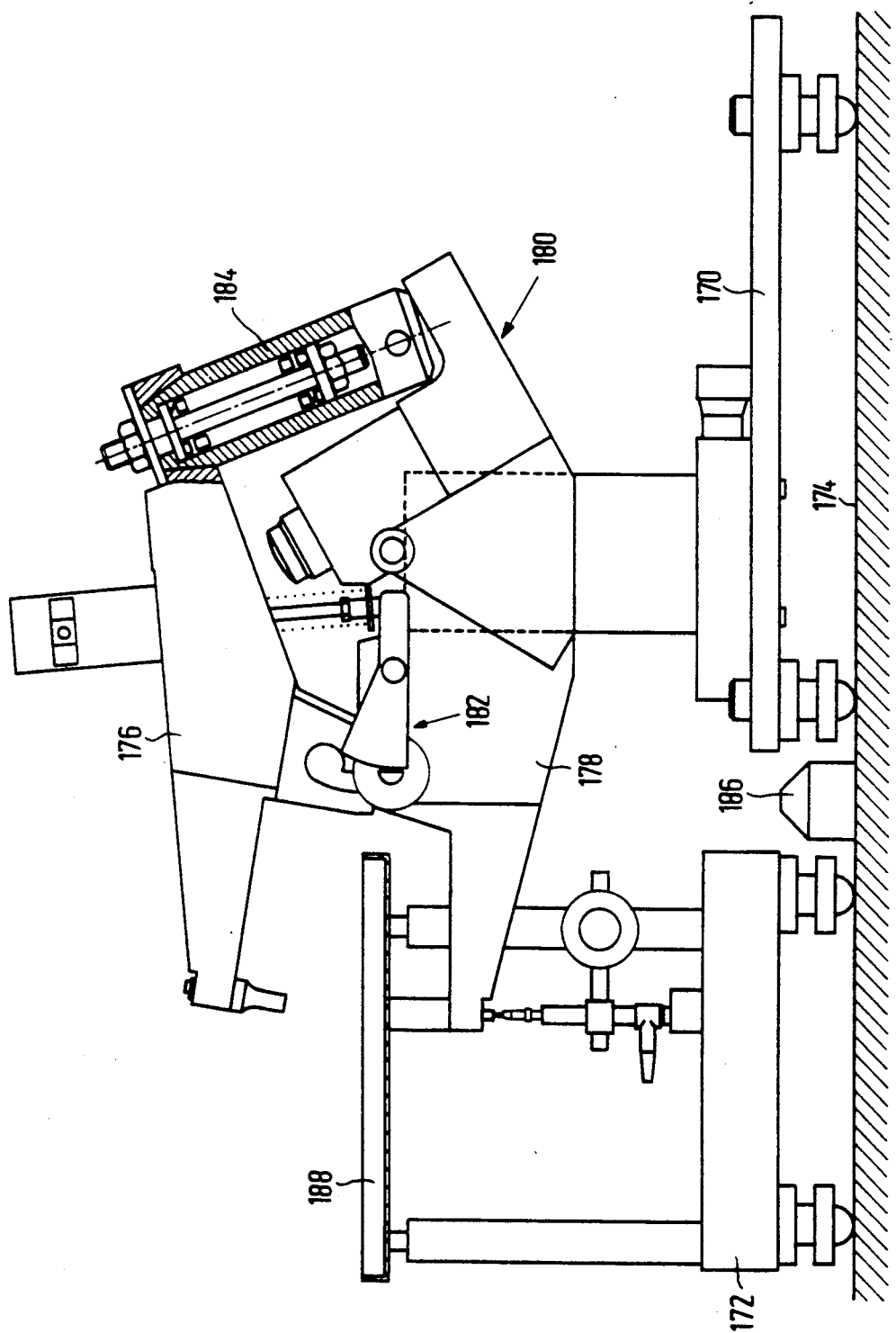
FIG. 7 shows an embodiment of a device according to FIG. 5 in which the pincer mechanism and an auxiliary frame are displaceable.
Figure 8:
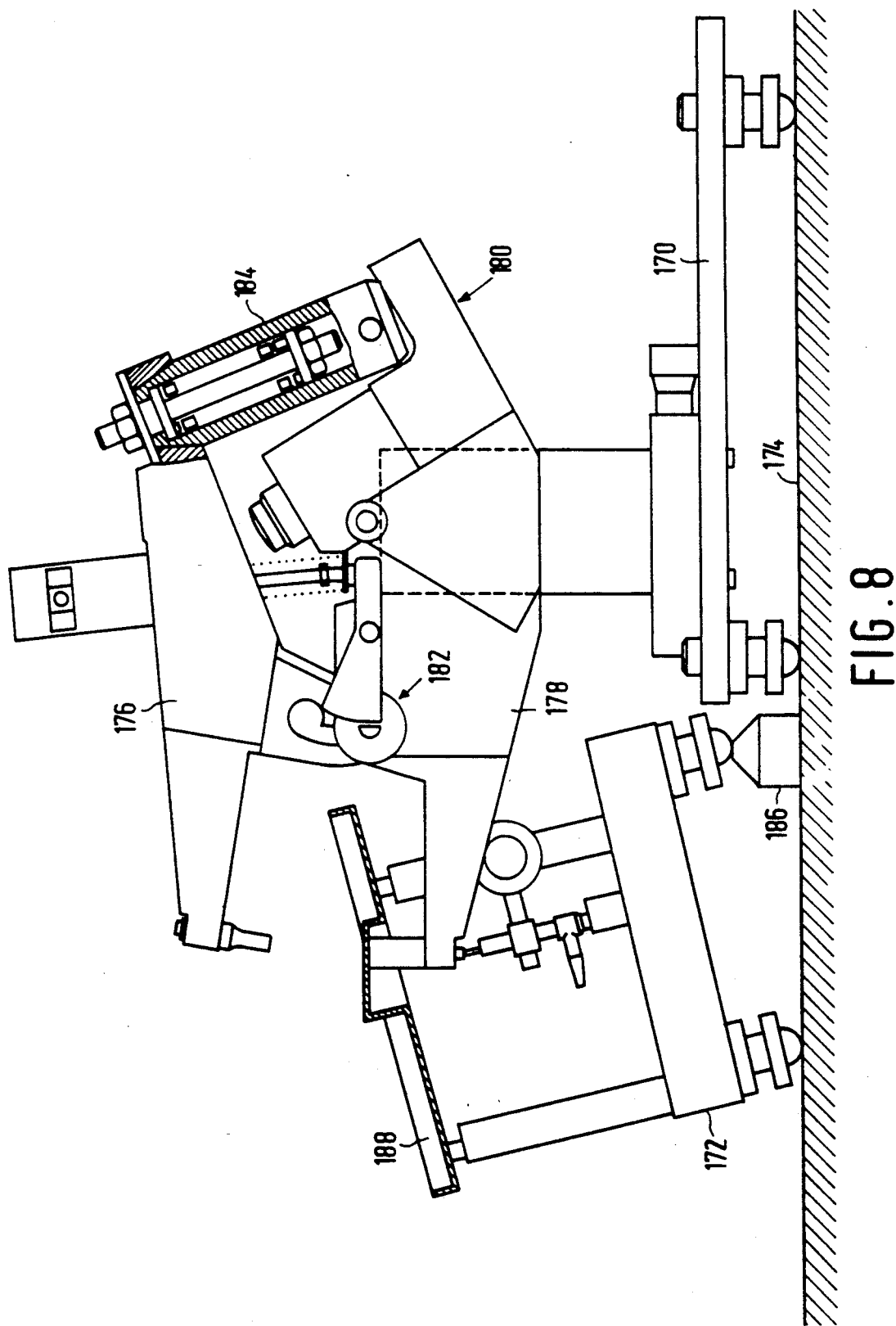
FIG. 8 shows the device according to FIG. 7 in which the auxiliary frame, with the plate thereon is placed at an angle relative to the main frame.

In order to position various components after one another on a plate with the device shown in FIG. 5, the plate must be displaceable relative to the pincer mechanism. One possibility for this is that the plate can be placed in various positions on the supports. Another possibility is to fit the bearing 148 on a mobile arm which is then fixed to the main frame. Yet another possibility is to displace the plate 152 relative to the pincer mechanism 138 in order to make the auxiliary frame and the main frame displaceable relative to each other. FIG. 7 shows an embodiment in which both the main frame 170 and the auxiliary frame 172 are displaceable relative to an external reference 174. The pincer mechanism 180 is provided with a mechanism 182 and a connecting rod 184 in order to move the two parts 176 and 178 of the pincer mechanism 180 far enough away from each other during the displacement. The external reference 174 is provided with a support 186 on which the main frame 172 can be placed in order to position components on the plate at an angle with the plane of the plate 188. FIG. 8 shows the situation in which the auxiliary frame 172 is placed at an angle. In this position, it is possible to position, for example, components of the plate 188 situation in which act as mounting faces for mounting a scanning unit of a video recorder.

Figure 8A:
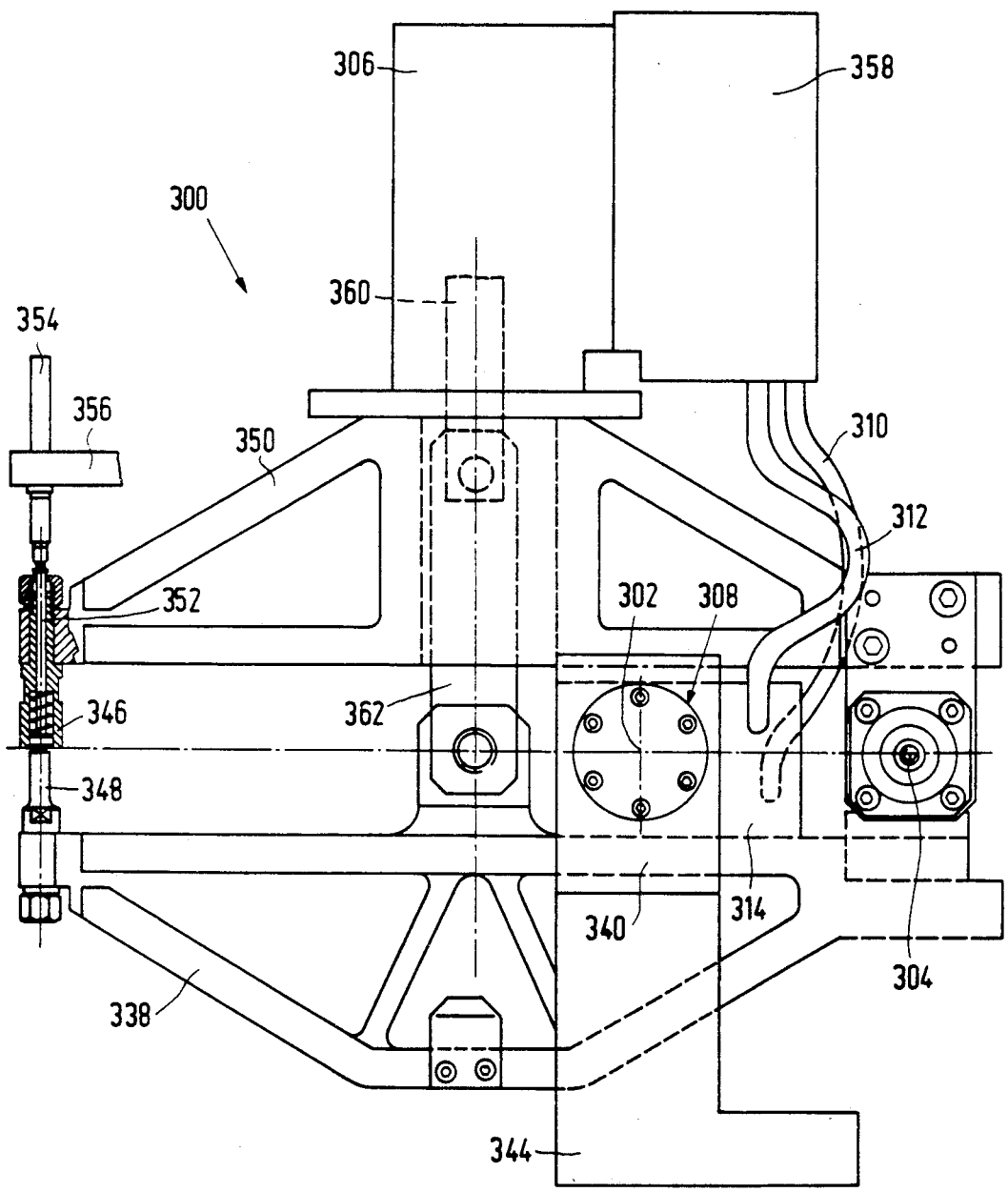
FIG. 8a shows a fifth embodiment of a device in which the die and the support are also fixed to a pincer mechanism but of a different construction.
Figure 8B:
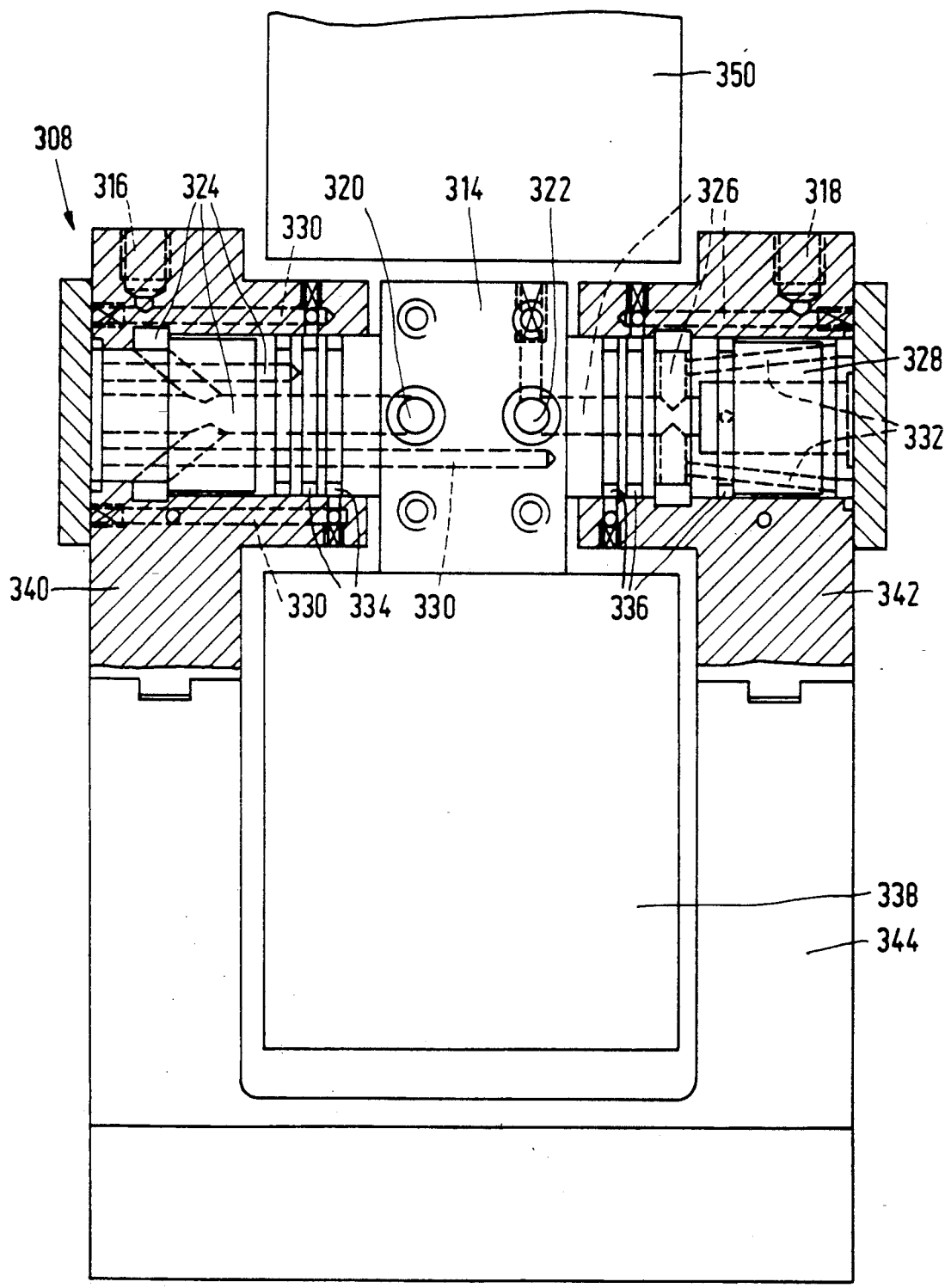

FIG. 8a shows another embodiment, pincer construction 300 which is supported on hydrostatic bearing 308 at its center of gravity 302. In this embodiment the point of rotation 304 for the two pincer parts 338 and 350 and the location for a the hydraulic cylinder 306 are moved relative to the other embodiments, as a result of which no extra mechanisms and connecting rod are needed to open the pincer construction sufficiently. Furthermore, the hydrostatic bearing 308 is constructed, virtually friction-free, to ensure that it is not possible for a resulting force to be exerted on the plate as a result of friction in the bearing 308. This is because, should there be friction in the bearing, this can then result in the transfer of a moment, which can lead to a force on the plate. In this embodiment, the lines 310 and 312 for the inlet to and outlet from the hydraulic cylinder 306 are coupled to the movable part 314 of the hydrostatic bearing 308, as a result of which no external forces can be exerted on the pincer construction 300 via the lines. FIG. 8b shows the construction of the hydrostatic bearing 308, with connection apertures 316, 318, 320 and 322 for external lines and for the hydraulic lines 310 and 312 coming from the hydraulic cylinder 306. External fluid inlet and outlet lines can be connected to the connection apertures 316 and 318 in the fixed parts 340 and 342 of the bearing, which apertures are in connection, via ducts 324 and 326 present in the bearing shaft 328, with the connection apertures 320 and 322 for connection of the lines 310 and 312 (FIG. 8a) from and to the hydraylic cylinder 306. Some of the fluid passes via further ducts 330 and 332 to fluid chambers 334 and 336 for the hydrostatic bearing. The movable part 314 of the bearing is rigidly connected to the lowermost part 338 of the pincer construction and the fixed parts 340 and 342 of the bearing are connected to the main frame 334. The support 346 and the die 348 are located at the free ends of the pincer parts 338 and 350, as can be seen in FIG. 8a. A cylindrical jaw 352 is present in the support 346 and is coupled with measuring means 354 for determining the position for the component to be positioned. The measuring means 354 are fixed to an auxiliary frame 356. The hydraulic cylinder 306 is fixed on the uppermost part 35 of the pincer construction and is provided, via a control valve 358, with fluid for moving the pincer parts 338 and 350 relative to one another. For this purpose piston 360 of the cylinder 306 is connected via a connecting hose 362 to the lowermost part 338 of the pincer construction.

Figure 9:
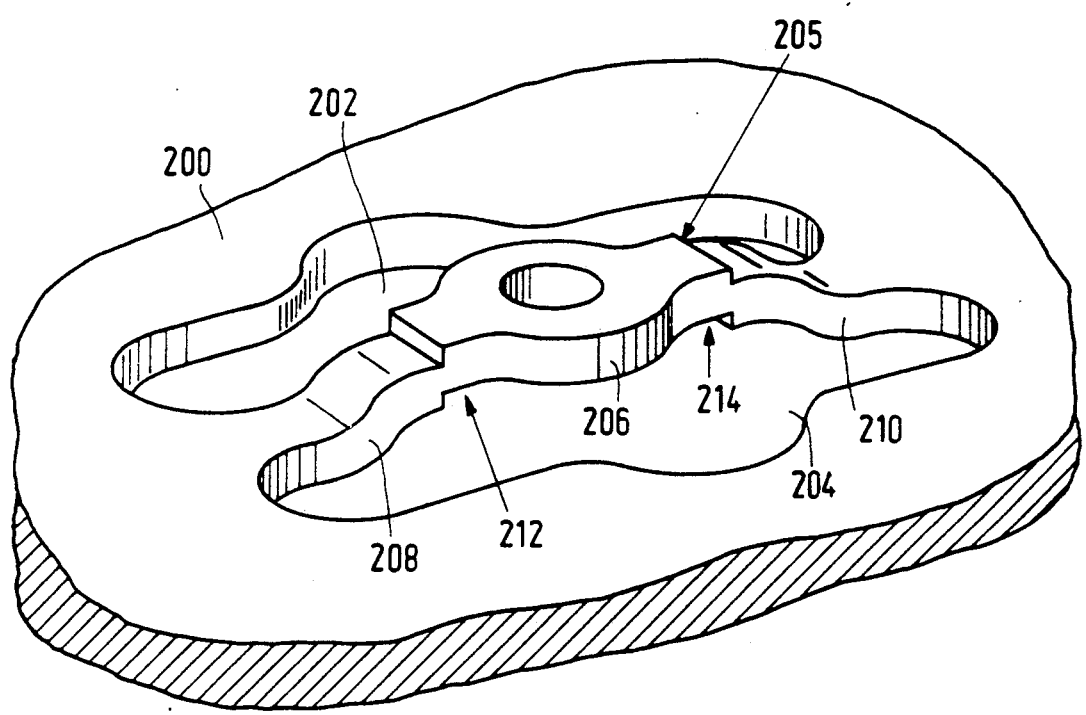
FIG. 9 shows a part of a plate-shaped product comprising a plate, a component of which is positioned by shearing.
Figure 10:
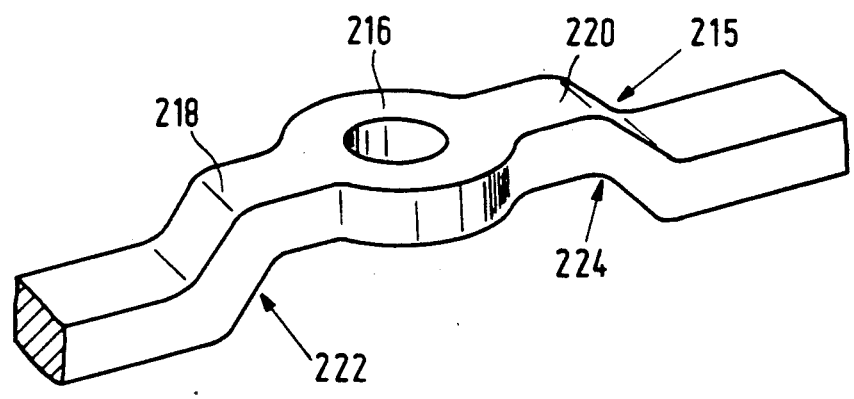
FIG. 10 shows a plate part, a component of which is positioned by stretching connecting plate parts.

Typical components (in these examples the components are a deformed part of the plate) positioned by a die and support of the various embodiments are shown in FIGS. 9 and 10. FIG. 9 shows a part of a plate-shaped product comprising a plate 200 of which a component 206 is positioned. The plate 200 is provided with apertures 202 and 204 on both sides of a plate part 205. The plate part 205 comprises a central plate part 206 which forms the component, and connecting plate parts 208 and 210 which connect the central plate part 206 to the remainder of the plate 200. The component 206 is positioned by shearing the central plate part 206 relative to the connecting plate parts 208 and 210. This is recognizable on the plate 200 by the presence of shearing zones 212 and 214.

FIG. 10 shows a plate part 215 in which a component 216 is positioned by stretching connecting plate parts 218 and 220 so that stretch zones 222 and 224 are produced.

Figure 11:
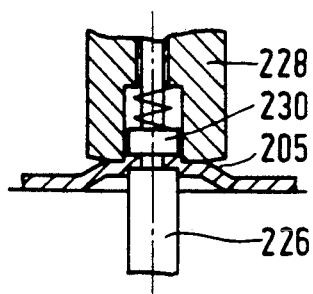
FIG. 11 shows a shearing operation on a plate.

FIG. 11 shows the plate part 205 during the positioning of a component of the plate. Shear occurs in the plate part 205 through moving die 226 and support 228 towards each other. The position of the component is measured by means of a plug gauge 230 which is fitted in the support 228.

Figure 12:
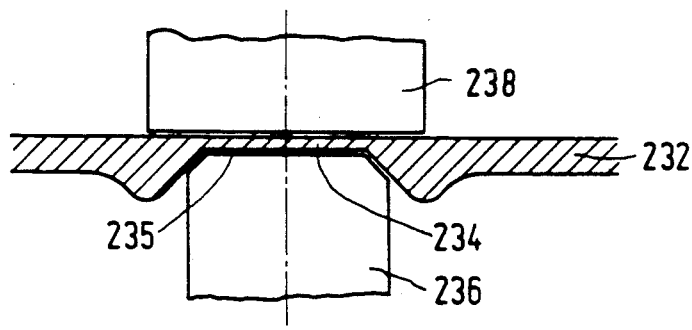
FIG. 12 shows an upsetting operation on a plate.

FIG. 12 shows a plate part 232 in which a component 234 is positioned by upsetting the plate. In this case a reference point 235 is situated on the side of the component 234 facing a die 236. At the other side of the component there is a support 238 with a greater diameter than that of the die 236.

Figure 13:
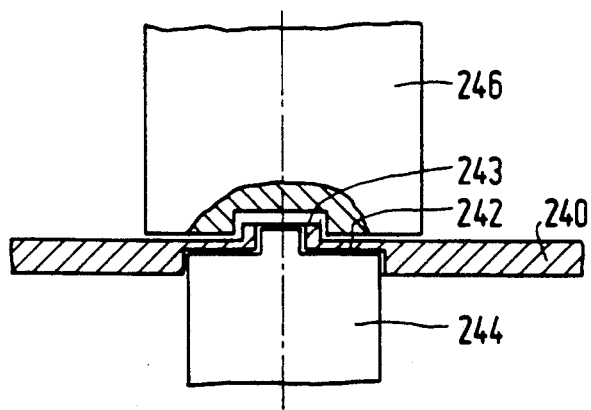
FIG. 13 shows an extrusion operation on a plate.

FIG. 13 shows a last example of a component 242 of a plate 240 which is positioned by means of a die 244 and a support 246. In this case the component 242 is upset and a reference point 243 is formed by a top face of an upset wall of the component 242.

Figure 14:
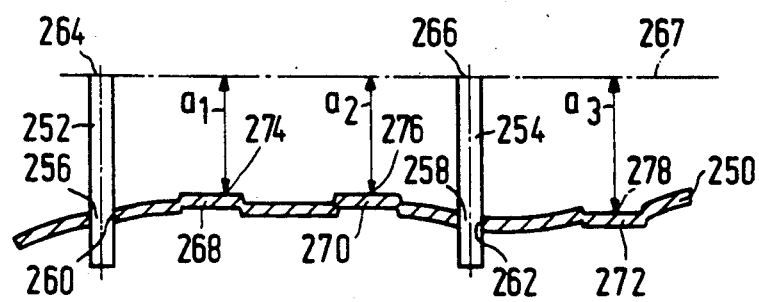
FIG. 14 shows a plate-shaped product comprising a plate in which components of the plate and components pressed into the plate are positioned relative to a reference plane.

FIG. 14 shows a plate-shaped product comprising a plate 250 in which components 268, 270 and 272 are formed by deformation of the plate and components 252 and 254 which are additional pins, are positioned relative to each other as elements pressed into apertures 256 and 258 in the plate. The elements 252 and 254 are positioned first and are clamped by walls 260 and 262 in the plate 250. A plane 267 through reference points 264 and 266 on the two elements shown and on a third element not shown forms a reference plane 267 for the components 268, 270 and 272 to be positioned after this. These components are placed at desired distances $a_1$, $a_2$ and $a_3$ from the reference plane 267.

It is pointed out that the invention is not limited to the embodiments of the method, of the device and of the plate-shaped product described and shown here. It is also possible to manufacture a chassis plate for an audio recorder, CD player or any other electrical appliance and to provide it with accurately positioned components. The displacement of the die and the support can also be achieved with the aid of a mechanical construction or an electrical construction, for example an electromagnet.

We claim:

1. A method of positioning a component on a plate comprising:
   identifying the position of a reference plane relative to said plate;
   positioning said component on said plate at a predetermined location relative to said reference plane, said positioning creating at least one force on said plate tending to cause elastic deformation of the plate; and
   supporting the plate during said positioning such that the plate is substantially free of said elastic deformation at least after said component reaches said predetermined location, said supporting including during said positioning measuring the position of the component to said reference plane and controlling the at least one force exerted on the plate.

2. The method of claim 1 wherein said supporting includes supporting the plate at support points, said supporting creating a force at each said support points, detecting elastic deformation in said plate and regulating one of the forces applied to said plate at said support points.

3. The method of claim 2 wherein said detecting includes measuring the forces applied at at least one of said support points.

4. The method of claim 3 wherein the regulating of one of said forces includes regulating said one force until essentially zero.

5. The method of claim 4 wherein said plate includes a wall, said positioning includes forcing an element through an aperture in said plate and causing said wall of the plate to clamp said element.

6. The method of claim 2 wherein said elastic deformation detecting includes detecting the relative displacement of said plate to at least one of said support points.

7. The method of claim 6 wherein the regulating of said plate position includes regulating the displacement of the plate at at least one of said support points until said displacement is essentially zero.

8. The method of claim 7 wherein said positioning includes locally plastic deforming a said plate for causing a plate part to form said component and to be positioned at said predetermined location.

9. The method of claim 8 wherein said plastic deforming includes stretching said plate.

10. The method of claim 8 wherein said plastic deforming includes shearing said plate.

11. The method of claim 8 wherein said plastic deforming includes upsetting said plate.

12. The method of claim 8 wherein said plastic deforming includes extruding said plate.

13. The method of claim 1 wherein said supporting includes supporting said plate at two reference support points and at a component positioning point to minimize said elastic deformation.

14. The method of claim 1 wherein the at least one forces exerted on said plate by said positioning is essentially zero.

15. The method of claim 1 wherein said plate includes a wall, said positioning includes forcing an element through an aperture in said plate and causing said wall of the plate to clamp said element.

16. The method of claim 1 wherein said positioning includes locally plastic deforming said plate for causing a plate part to form said component and to be positioned at said predetermined location.

17. The method of claim 1 wherein said identifying the position of the reference plane includes forming said reference plane at the positions of support bearing points for said plate and measuring the position of said bearing points.

18. The method of claim 1 wherein said positioning step includes sequentially positioning the components on said plate.

19. The method of claim 18 wherein said positioning step includes positioning three components on said plate and forming a further reference plane through reference points on the three components for further components to be positioned on said plate.

20. A method of forming a plate-like object including a plate and a component comprising:
   identifying the position of a reference plane relative to said plate;
   positioning said component on said plate at a predetermined location relative to said reference plane, said positioning creating at least one force tending to cause elastic deformation of the plate, said elastic deformation tending to displace said component from said location; and compensating for said at least one force during said positioning such that the plate is substantially free of elastic deformation at least after said component reaches said predetermined location, said compensating including controlling the at least one force so that he component is at said predetermined location after said positioning.

21. The method of claim 20 including positioning a plurality of components on said plate, each component at a corresponding predetermined location relative to said plane.

22. The method of claim 20 including forming said reference plane at a plurality of support bearings and displacing at least one of said bearings to maintain the reference plane at a predetermined position.

23. An apparatus for positioning a component on a plate comprising:
   a main frame;
   a die and a support secured to the main frame, at least one of said die and support being movably secured to the main frame for positioning a component on said plate, said positioning tending to cause elastic deformation of said plate;
   an auxiliary frame including bearing means for supporting said plate;
   measuring means for determining the position of the component relative to a reference plane; and
   control means responsive to said measuring means for positioning the component on the plate at a predetermined position relative to said plane and for controlling at least one of said die, support and bearing means for causing the supported plate to be substantially free of said elastic deformation at least when the component has reached said predetermined position on said plate.

24. The apparatus of claim 23 wherein said support and die are movable, said means for controlling includes positioning means for controlling the position of at least said support.

25. The apparatus of claim 23 wherein said bearing means includes a movable plate support bearing, said means for controlling includes positioning means for controlling the position of said support bearing.

26. The apparatus of claim 25 wherein said bearing means comprises three bearing points for said plate and force measuring means for measuring force at at least one of the bearing points.

27. The apparatus of claim 23 including second measuring means for measuring displacement of said plate at the position of said support relative to the reference plane.

28. The apparatus of claim 23 wherein said bearing means comprises two plate support bearing points and said means for controlling includes means for controlling the position of at least one of said support and said two plate support bearing points.

29. Apparatus according to claim 28 further including a sub-frame, provided with three further bearing points on which the plate can rest, which sub-frame rests on the two bearing points present on the auxiliary frame, and said measuring means comprises means for measuring the position of the component and of the sub-frame relative to an external reference.

30. The apparatus of claim 29 including at least one hydraulic cylinder for displacing the at least one die and support.

31. Apparatus according to claim 23 wherein the die and the support form part of a pincer construction which has a center of gravity and is supported, at the center of gravity, on second bearing means on the main frame and in that the means for causing comprises the second bearing means.

32. Apparatus according to claim 31 wherein said second bearing means comprises a hydrostatic bearing having a fluid inlet and second aperture and stationary and moving parts, which apertures are located in that part of the bearing which is stationary and is attached to the main frame.

33. Apparatus according to claim 32 wherein the pincer construction comprises a hydraulic cylinder including a movable part and having fluid inlet and outlet lines which, at the location of further fluid inlet and outlet apertures located in the movable part of the hydraulic cylinder, are coupled with the hydrostatic bearing, the inlet and outlet apertures being in connection, via ducts through the bearing, with further inlet and outlet orifices in said hydrostatic bearing.

34. Apparatus according to claim 31 wherein the pincer construction comprises a movable arm on which one of the die and the support are situated.

35. Apparatus according to claim 31 including a plurality of mating dies and supports and a plurality of hydraulic cylinders for displacement of the mating dies and supports.

36. Apparatus according to claim 23 including at least one hydraulic cylinder for displacing the at least one die and support.

37. Apparatus according to claim 23 including means for displacing the auxiliary frame relative to the main frame.

38. An apparatus for forming a plate-like structure comprising a component attached to a plate comprising:
means for identifying the position of a reference plane relative to said plate;
means for positioning said component on said plate at a predetermined location relative to said reference plane, said means for positioning creating at least one force on said plate tending to cause elastic deformation of the plate; and
means for compensating for such elastic deformation during said positioning such that the plate is substantially free of said elastic deformation at least after said component reaches said predetermined location, said means for compensating including means for measuring the position of the component to said reference plane during said positioning and means for controlling the at least one force exerted on the plate.

39. Apparatus for forming a plate-like structure comprising a component on a plate comprising:
means for identifying the position of a reference plane relative to said plate;
means for positioning said component on said plate at a predetermined location relative to said reference plane, said positioning creating at least one force on said plate tending to cause elastic deformation of the plate; and
means for compensating for said at least one force during said positioning such that the plate is substantially free of said elastic deformation at least after said component reaches said predetermined location, said means for compensating including force controlling means for controlling said at least one force to minimize said elastic deformation.

* * * * *